United States Patent [19]
Verlaeten et al.

[11] 4,260,594
[45] Apr. 7, 1981

[54] METHOD FOR THE MANUFACTURE OF CRYSTALS OF SODIUM CARBONATE MONOHYDRATE

[75] Inventors: Jean Verlaeten; Maurice Preumont, both of Brussels, Belgium

[73] Assignee: Solvay & Cie., Brussels, Belgium

[21] Appl. No.: 890,013

[22] Filed: Mar. 24, 1978

[30] Foreign Application Priority Data

Mar. 25, 1977 [FR] France ................. 77 09256

[51] Int. Cl.³ .............................................. B01D 9/02
[52] U.S. Cl. ..................................... 423/421; 23/301; 23/302 T
[58] Field of Search .............. 23/302 T, 301; 423/186, 423/189, 421

[56] References Cited

U.S. PATENT DOCUMENTS

| | | | |
|---|---|---|---|
| 3,628,919 | 12/1971 | Beauchamp | 23/301 R |
| 3,842,157 | 10/1974 | Neumann | 423/421 |
| 3,843,768 | 10/1974 | Neumann | 423/186 |
| 3,975,503 | 8/1976 | Hauschild et al. | 423/189 |

FOREIGN PATENT DOCUMENTS

597474 11/1960 Belgium .
 97474 11/1960 France .
924245 4/1963 United Kingdom .

OTHER PUBLICATIONS

Condensed Chemical Dictionary-Hawley, 8th Ed., Van Nostrand Reinhold 10, N.Y. 1971.

*Primary Examiner*—Hiram Bernstein
*Attorney, Agent, or Firm*—Spencer & Kaye

[57] ABSTRACT

Method for the manufacture of crystals of sodium carbonate monohydrate, comprises crystallizing sodium carbonate monohydrate from a carbonated aqueous liquor of sodium hydroxide above 35° C. and separating the crystals of sodium carbonate monohydrate and a mother liquor. The sodium carbonate monohydrate is crystallized on crystalline seeds of sodium carbonate monohydrate obtained by evaporation, between 35° and 107.5° C., of a solution of sodium carbonate free from sodium hydroxide.

14 Claims, 1 Drawing Figure

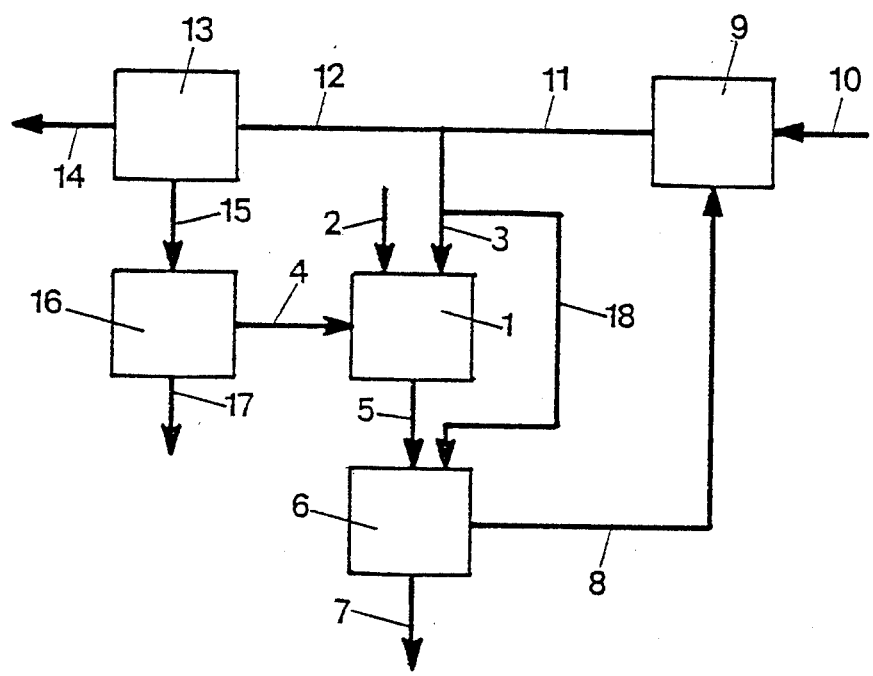

METHOD FOR THE MANUFACTURE OF CRYSTALS OF SODIUM CARBONATE MONOHYDRATE

BACKGROUND OF THE INVENTION

The present invention relates to a method for the manufacture of crystals of sodium carbonate monohydrate from carbonated aqueous solutions of sodium hydroxide.

More particularly, the present invention relates to crystallization of sodium carbonate monohydrate by carbonation of caustic liquors such as those obtained by electrolysis of sodium chloride brines.

In a known method of manufacturing sodium carbonate monohydrate, described in Belgian Pat. No. 597,474 filed on Nov. 24th, 1960, in the name of Imperial Chemical Industries Limited, sodium carbonate monohydrate is crystallized by mixing an aqueous solution containing at least 56% by weight of sodium hydroxide with a carbonated solution, the crystals obtained and a mother liquor are separated, and the mother liquor is treated with a gas containing $CO_2$ in order to form the aforesaid carbonated solution.

In this known method, the aqueous solution of sodium hydroxide may result from the decomposition of a sodium amalgam obtained by the electrolysis of a sodium chloride brine in a cell with a mercury cathode.

The sodium carbonate monohydrate obtained by this method is intended mainly for the production of dense sodium carbonate, to be employed, for example, in the steel industry and the glass industry.

In practice, this known method does, however, have the disadvantage of producing poorly crystallized sodium carbonate monohydrate. The anhydrous sodium carbonate obtained by calcining these sodium carbonate monohydrate crystals has an apparent specific gravity that is too low for efficient use in steel and glass manufacture.

In U.S. Pat. No. 3,628,919 to Beauchamp, there is described a process for crystallizing sodium carbonate (possibly monohydrated) starting from aqueous solutions containing organic materials. It aims more particularly at furnishing a process which avoids the unfavorable action of these organic materials on the sodium carbonate crystals. According to the Beauchamp process, sodium carbonate is crystallized onto seed crystals obtained under good crystallization conditions. The choice of the source of seed crystals is not however critical. Further, the Beauchamp patent is not concerned with the use of carbonated aqueous solutions of sodium hydroxide.

SUMMARY OF THE PRESENT INVENTION

There has now been found, in accordance with the present invention, an improved method which allows the disadvantage of the above described known method of Belgian Pat. No. 597,474 to be avoided.

The present invention provides a method for the manufacture of crystals of sodium carbonate monohydrate by crystallizing sodium carbonate monohydrate from a carbonated aqueous sodium hydroxide liquor above 35° C., and separating the crystals obtained and a mother liquor, comprising carrying out the crystallization of the sodium carbonate monohydrate on seed crystals of sodium carbonate monohydrate obtained by evaporation, between 35° to 107.5° C., of an aqueous solution of sodium carbonate free from sodium hydroxide.

Thus, the present invention relates to the discovery that seed crystals which contain dissolved sodium hydroxide have an unfavorable influence on the morphology of monohydrated sodium carbonate crystals formed by crystallization from a carbonated liquor of sodium hydroxide on the seeds, and that to avoid the problem seed crystals should be used which are obtained by evaporation at a temperature of 35° to 107.5° C. of an aqueous solution of sodium carbonate free from sodium hydroxide.

It is to be understood that both the foregoing general description and the following detailed description are exemplary, but are not restrictive of the invention.

BRIEF DESCRIPTION OF THE DRAWINGS

The sole FIGURE of the drawing shows a flow diagram of a preferred embodiment of the method of the present invention.

DETAILED DESCRIPTION OF THE INVENTION

In the method according to the present invention, the carbonated aqueous sodium hydroxide liquor is an aqueous solution of sodium hydroxide and sodium carbonate. The crystallization of the carbonated sodium hydroxide liquor is controlled, in a known manner, so that it takes place substantially without the creation of nuclei, mainly by growth of the seeds obtained by evaporation of the solution of sodium carbonate free from sodium hydroxide. The seeds obtained by evaporation of the solution of sodium carbonate free from sodium hydroxide are crystals of sodium carbonate monohydrate small in size in comparison with the size of the sodium carbonate monohydrate crystals that are to be made. The size distribution of the seed crystals is not critical and may be controlled, in a known manner, during evaporation of the solution of sodium carbonate free from sodium hydroxide. It is fixed as a function of the size distribution desired for the sodium carbonate monohydrate crystals, as well as the respective feed rates by weight of the seeds and the carbonated sodium hydroxide liquor. In general, in order to obtain sodium carbonate monohydrate crystals of diameter substantially between 0.30 and 0.40 mm, the size distribution of the seed crystals may, for example, be set between 0.20 and 0.30 mm.

The carbonated sodium hydroxide liquor may, for example, be obtained by carbonating a caustic liquor coming from an electrolytic cell, with a gas containing $CO_2$. In a modification, at least a part of the mother liquor recovered after separation of the sodium carbonate monohydrate crystals may be recycled into the caustic liquor.

In a first advantageous embodiment of the method according to the present invention, at least a part of the mother liquor is treated with a gas containing $CO_2$, then the carbonated mother liquor thereby obtained is mixed with an aqueous solution of sodium hydroxide, for example a caustic liquor from an electrolytic cell, to obtain the aforesaid carbonated sodium hydroxide liquor.

In this embodiment of the present invention, it is preferable to use a caustic liquor which is concentrated in respect of sodium hydroxide, containing between 30 and 55% by weight approximately of sodium hydroxide, and the temperature at which this caustic liquor is mixed with the carbonated mother liquor is controlled so that the resultant carbonated sodium hydroxide liquor is supersaturated in respect of sodium carbonate monohydrate and crystallizes in situ on the seeds.

In a second advantageous embodiment of the method according to the present invention, the seed crystals of sodium carbonate monohydrate are obtained by treating at least a part of the mother liquor with a sufficient amount of a gas containing $CO_2$ to carbonate substantially the whole of the sodium hydroxide that the liquor contains, and then evaporating the carbonated solution free from sodium hydroxide thus obtained.

In a third embodiment of the method according to the present invention, which is preferred, the mother liquor is treated with a sufficient quantity of a gas containing $CO_2$ to carbonate substantially the whole of the sodium hydroxide that the liquor contains, a part of the carbonated mother liquor thus obtained is evaporated to produce the aforesaid seed crystals of sodium carbonate monohydrate, and another part of the carbonated mother liquor is mixed with a caustic liquor to produce the carbonated sodium hydroxide liquor.

In this third embodiment of the method according to the present invention, the seed crystals so obtained may be brought into contact with the carbonated sodium hydroxide liquor in the form of a suspension in mother liquor.

According to an advantageous modification of this third preferred embodiment of the present invention, the seed crystals are separated from the carbonated mother liquor and this mother liquor is removed. This modification of the present invention is particularly advantageous in the case where the caustic liquor which is treated is a caustic brine resulting from the electrolysis of a sodium chloride brine in a diaphragm cell, since it enables the content of sodium chloride in the mother liquor to be maintained at a substantially constant low value. In this modification of the present invention, it is advantageous, before mixing the caustic brine with the carbonated mother liquor, to evaporate the caustic brine until it contains about 50% by weight of sodium hydroxide, so that its sodium chloride content is reduced to the minimum.

In the above three advantageous embodiments of the present invention, the carbonation of the mother liquor may be carried out easily in a packed column by means of a gas of low $CO_2$ content, for example flue gases.

The method according to the present invention brings the advantage of permitting well crystallized sodium carbonate monohydrate of high apparent specific gravity to be obtained starting with aqueous solutions of sodium hydroxide, more particularly starting with caustic liquors from electrolytic cells of the mercury cathode type, the diaphragm type or the membrane type. The crystals of sodium carbonate monohydrate obtained by the method according to the present invention are particularly well suited to the production of dense anhydrous sodium carbonate of high quality.

Special features and details of the invention will become apparent from the following detailed description of the single FIGURE of the appended drawing, which shows the outline of a preferred embodiment of the method according to the present invention.

In the method shown schematically in the FIGURE, a crystallizer 1 is fed continuously with an aqueous solution 2 containing 50% by weight of sodium hydroxide, with a carbonated mother liquor 3 and with seed crystals 4 of sodium carbonate monohydrate. The mixture of the aqueous solution of sodium hydroxide 2 and carbonated mother liquor 3 forms, in the crystallizer, a carbonated sodium hydroxide liquor, saturated in respect of sodium carbonate monohydrate, which crystallizes in situ of the seed crystals 4. From the crystallizer 1 is withdrawn an aqueous suspension 5 of sodium carbonate monohydrate crystals, which is treated in a dewatering or filtration apparatus 6 in order to separate sodium carbonate monohydrate crystals 7 and a mother liquor 8.

The mother liquor 8 is saturated in respect of sodium carbonate and also contains some dissolved sodium hydroxide. It is treated, in a carbonator 9, with a sufficient amount of a gas 10 containing $CO_2$ to carbonate the whole of the sodium hydroxide it contains.

The carbonated mother liquor 11 withdrawn from the carbonater 9 is an aqueous solution of sodium carbonate, free from sodium hydroxide. It is divided into two portions 3 and 12.

The portion 3 of carbonated mother liquor is introduced into the crystallizer 1, as described above, while the portion 12 is introduced into an evaporator 13, where it is evaporated at a temperature above 35° C. to crystallize seeds of sodium carbonate monohydrate. From evaporator 13 there are withdrawn water 14 in the vapor state and an aqueous suspension 15 of seeds of sodium carbonate monohydrate.

By passing suspension 15 into a dewatering or filtration apparatus 16, seed crystals 4 of sodium carbonate monohydrate and a carbonated solution 17 are separated. The separated seed crystals 4 which are withdrawn from the dewatering or filtration apparatus 16 are fed into the crystallizer 1, as has been described above.

The sodium carbonate monohydrate crystals withdrawn at 7 from the dewatering or filtration apparatus 6 are removed to a plant as known (not shown) to convert them to dense anhydrous sodium carbonate.

In the method that has just been described, with reference to the appended FIGURE, the sum of the weight of water removed at 14 from evaporator 13 and the weight of water removed with the carbonated solution at 17 corresponds substantially to the weight of water introduced into the crystallizer 1 by the sodium hydroxide solution 2.

The aqueous solution 2 of sodium hydroxide may advantageously be a caustic liquor obtained by the electrolysis of a sodium chloride brine and concentrated before use. It may, for example, be a caustic brine obtained from a diaphragm cell. In the latter case, the aqueous solution 17 leaving the dewatering or filtration apparatus 16 contains some dissolved sodium chloride and may be employed as a reagent for purifying raw brine or feed-brine for an ammonia-soda plant or for an electrolytic installation for the production of chloride or alkali metal chlorate.

The feed of gas 10 containing $CO_2$ is preferably controlled so as to avoid crystallization of sodium bicarbonate in the carbonater 9. In this modification of the invention, the carbonater 9 may therefore be a packed column, which allows the use of a gas of low $CO_2$ content, for example flue gases containing between 5 and 15% by weight of $CO_2$.

In a modification of the method of the appended FIGURE, a portion 18 of the carbonated mother liquor is diverted for washing the sodium carbonate monohydrate crystals separated in the dewatering and filtering apparatus 6, this portion of carbonated mother liquor afterwards being recycled into the mother liquor 8.

In another modification, not shown, of the method which has been described, more specially applicable to the case where the aqueous solution 2 of sodium hydroxide is free from sodium chloride, the aqueous suspension 15 of seeds leaving evaporator 13 is introduced directly into crystallizer 1. In this modification of the present invention, the weight of water vapor 14 removed from evaporator 13 must be substantially equal to the weight of water introduced into crystallizer 1 by the sodium hydroxide solution 2.

The following example illustrates the method according to the present invention shown schematically in the appended FIGURE. It is applied to the treatment of a caustic brine coming from an electrolytic diaphragm cell. This caustic brine, after being concentrated, contained, per kg, 500 g of sodium hydroxide and 12 g of sodium chloride.

1000 kg of this caustic brine were introduced into crystallizer 1. There were also introduced into the crystallizer 1, on one side 4454 kg of carbonated mother liquor 3 containing, per kg, 17 g of NaCl and 268 g of $Na_2CO_3$ and, on the other side 215 kg of sodium carbonate monohydrate seeds 4. The temperature of crystallizer 1 was maintained at 60° C., to bring about crystallization of sodium carbonate monohydrate on the seeds. From the crystallizer, there were withdrawn 764 kg of sodium carbonate monohydrate crystals 7 and 4905 kg of mother liquor 8 containing, per kg, 102 g of NaOH, 148 g of $Na_2CO_3$ and 18 g of NaCl.

The mother liquor 8 recovered from crystallizer 1 was introduced into carbonation column 9, where it was treated with 274 kg of carbon dioxide 10. The temperature in column 9 was 60° C. In carbonation column 9, all the sodium hydroxide in the mother liquor 8 was converted to sodium carbonate. Thus, from column 9 there were withdrawn 5179 kg of carbonated mother liquor 11 free from sodium hydroxide and containing, per kg, 268 g of $Na_2CO_3$ and 17 g of NaCl. This carbonated mother liquor 11 was divided into two separate fractions: a first fraction 3 weighing 4454 kg was introduced into the crystallizer 1, as described above; and a second fraction 12 weighing 725 kg was introduced into evaporator 13.

The temperature in evaporator 13 was maintained at 90° C. 442 kg of water were evaporated therein and thus 283 kg of an aqueous suspension 15 of sodium carbonate monohydrate crystals were withdrawn from the evaporator 13. In dewatering apparatus 16, there were separated from this aqueous suspension 215 kg of sodium carbonate monohydrate crystals 4 and 68 kg of a carbonated brine containing, per kg, 130 g of $Na_2CO_3$ and 176 g of NaCl.

The 215 kg of sodium carbonate monohydrate crystals 4 were introduced as seed crystals into the crystallizer 1, as described above.

The operating conditions of the working example that has been described are recorded in the following table where the figures in parenthesis correspond to the reference numerals shown in the drawing.

| Stages of the cycle | | Temperature (°C.) | Weight (kg) | Composition (% by weight) | | | |
|---|---|---|---|---|---|---|---|
| | | | | NaOH | NaCl | $Na_2CO_3$ | $H_2O$ |
| Crystallizer (1) | | 60 | | | | | |
| Aqueous solution of NaOH | (2) | | 1000 | 50 | 1.2 | — | 48.8 |
| Fraction of carbonated mother liquor | (3) | | 4454 | — | 1.7 | 26.8 | 71.5 |
| Seed crystals of $Na_2CO_3 . H_2O$ | (4) | | 215 | — | — | 85.5 | 14.5 |
| Crystals of $Na_2CO_3 . H_2O$ | (7) | | 764 | — | — | 85.5 | 14.5 |
| Mother liquor | (8) | | 4905 | 10.2 | 1.8 | 14.8 | 73.2 |
| Carbonator (9) | | 60 | | | | | |
| Mother liquor | (8) | | 4905 | 10.2 | 1.8 | 14.8 | 73.2 |
| $CO_2$ | (10) | | 274 | — | — | — | — |
| Carbonated mother liquor | (11) | | 5179 | — | 1.7 | 26.8 | 71.5 |
| Evaporator (13) | | 90 | | | | | |
| Fraction of carbonated mother liquor | (12) | | 725 | — | 1.7 | 26.8 | 71.5 |
| Water vapor | (14) | | 442 | — | — | — | 100 |
| Seed crystals of $Na_2CO_3 . H_2O$ | (4) | | 215 | — | — | 85.5 | 14.5 |
| Carbonated brine | (17) | | 68 | — | 17.6 | 13.0 | 69.4 |

By calcination of the sodium carbonate monohydrate obtained by the method according to the present invention there was produced dense anhydrous sodium carbonate, the apparent specific gravity of which is generally at least equal to 1 $kg/dm^3$ and may be up to 1.1 $kg/dm^3$.

By way of comparison, anhydrous sodium carbonate derived from calcination of sodium carbonate monohydrate obtained by the method described in the aforementioned Belgian Pat. No. 597,474 has in general an apparent specific gravity of the order of 0.7 $kg/dm^3$.

It will be understood that the above description of the present invention is susceptible to various modifications, changes and adaptations, and the same are intended to be comprehended within the meaning and range of equivalents of the appended claims.

What is claimed is:

1. In a method for the manufacture of crystals of sodium carbonate monohydrate in which solid sodium carbonate monohydrate is introduced into a carbonated aqueous liquor of sodium hydroxide, sodium carbonate monohydrate is crystallized from said carbonated aqueous liquor of sodium hydroxide above 35° C., and crystals of sodium carbonate monohydrate and a mother liquor are separated, the improvement comprising obtaining said solid sodium carbonate monohydrate as crystalline seeks by evaporating, between 35° C. and 107.5° C., a solution of sodium carbonate which is free from sodium hydroxide, and obtaining said crystals of sodium carbonate monohydrate by crystallization from said carbonated aqueous liquor of sodium hydroxide on said crystalline seeds, substantially without the creation of nuclei.

2. Method according to claim 1, wherein, to obtain the solution of sodium carbonate free from sodium hydroxide, at least a part of the mother liquor is treated with a sufficient amount of a gas containing $CO_2$ to carbonate substantially all the sodium hydroxide that it contains.

3. Method according to claim 1 wherein, to form the carbonated aqueous liquor of sodium hydroxide, an aqueous solution of sodium hydroxide and at least a fraction of the said mother liquor are mixed together.

4. Method according to claim 3, wherein the fraction of the mother liquor is treated with a gas containing $CO_2$ before it is mixed with the solution of sodium hydroxide.

5. Method according to claim 3, wherein the solution of sodium hydroxide contains between 30 and 55% by weight approximately of sodium hydroxide.

6. Method according to claim 3, wherein the aqueous solution of sodium hydroxide derives from the electrolysis of an aqueous solution of sodium chloride.

7. Method according to claim 6, wherein the aqueous solution of sodium hydroxide is a caustic brine coming from an electrolytic diaphragm cell.

8. Method according to claim 7, wherein the caustic brine contains about 50% by weight of sodium hydroxide.

9. Method according to claim 1, wherein the mother liquor separated from the crystals of sodium carbonate monohydrate is treated with a sufficient amount of gas containing $CO_2$ to carbonate substantially the whole of the sodium hydroxide that it contains to form a carbonated solution free from sodium hydroxide; a fraction of the resultant carbonated solution free from sodium hydroxide is evaporated to produce the seeds of sodium carbonate monohydrate; and an aqueous solution of sodium hydroxide is mixed, in the presence of the seeds, with another fraction of the said carbonated solution free from sodium hydroxide to form the carbonated aqueous liquor of sodium hydroxide.

10. Method according to claim 1, wherein before crystallizing the sodium carbonate monohydrate from the carbonated sodium hydroxide liquor on the crystalline seeds, these seeds are separated from the evaporated carbonated solution free from sodium hydroxide.

11. Method according to claim 1, wherein the crystals of sodium carbonate monohydrate which are separated from the mother liquor are washed with a fraction of the solution of sodium carbonate free from sodium hydroxide, which fraction is then recycled to the mother liquor.

12. A method according to claim 9 wherein the seed crystals are brought into contact with the carbonated aqueous liquor of sodium hydroxide in the form of a suspension in the mother liquor.

13. Method according to claim 1 wherein the mother liquor which is separated from the crystals of sodium carbonate monohydrate contains sodium hydroxide, the separated mother liquor is carbonated to form a carbonated solution, and at least a fraction of the carbonated solution is mixed with an aqueous solution of sodium hydroxide to form the carbonated aqueous liquor of sodium hydroxide.

14. Crystals of sodium carbonate monohydrate obtained by the method according to claim 1.

* * * * *